United States Patent [19]

Matsui et al.

[11] Patent Number: 5,384,292
[45] Date of Patent: Jan. 24, 1995

[54] SILICON NITRIDE COMPOSITE SINTERED BODY AND PROCESS FOR PRODUCING THE SAME

[75] Inventors: Jin-Joo Matsui; Osamu Komura; Akira Yamakawa; Masaya Miyake, all of Itami, Japan

[73] Assignee: Sumitomo Electric Industries, Ltd., Japan

[21] Appl. No.: 220,457

[22] Filed: Mar. 31, 1994

Related U.S. Application Data

[63] Continuation of Ser. No. 48,464, Apr. 14, 1993, abandoned.

[51] Int. Cl.$^6$ ............................................. C04B 35/58
[52] U.S. Cl. ........................................ 501/97; 501/98
[58] Field of Search ................................. 501/97, 98

[56] References Cited

U.S. PATENT DOCUMENTS

| | | | |
|---|---|---|---|
| 4,923,829 | 5/1990 | Yasutomi et al. | 501/97 X |
| 5,045,513 | 9/1991 | Mizuno et al. | 501/98 |
| 5,178,647 | 1/1993 | Komatsu et al. | 501/97 X |
| 5,214,009 | 5/1993 | Komatsu et al. | 501/98 |
| 5,316,856 | 5/1994 | Suzuki et al. | 501/97 X |

*Primary Examiner*—Karl Group
*Attorney, Agent, or Firm*—Jordan B. Bierman

[57] ABSTRACT

A silicon nitride composite sintered which comprises crystal grains of silicon nitride and/or sialon having an average minor axis length of 0.05 to 3 μm and an aspect ratio of 10 or less and foreign particles dispersed in the crystal grains and/or the grain boundary phase, said particles having a thermal expansion coefficient of $5 \times 10^{-6}/°C.$ or more and an average particle size of 1 to 500 nm. The sintered body is produced by wet mixing silicon nitride powder, at least two sintering aids selected from among $Y_2O_3$, $Al_2O_3$, AlN and MgO and at least one compound selected from among the oxides, nitrides, carbides and silicides of the elements, excluding Si and C, of the groups IIa, IIIa, IVa, Va, VIa, IIb, IIIb and IVb of the Periodic Table to form a molding; and heat treating under the specified conditions. The sintered body can also be obtained by coating the surfaces of silicon nitride crystal grains with an organometallic compound convertible to the above foreign particles, heat treating and sintering with the sintering aid.

1 Claim, No Drawings

SILICON NITRIDE COMPOSITE SINTERED BODY AND PROCESS FOR PRODUCING THE SAME

This application is a continuation, of application Ser. No. 08/048,464, filed Apr. 14,1993, now abandoned.

BACKGROUND OF THE INVENTION

1. Field of the Invention

The present invention relates to a silicon nitride composite sintered body having high strength and high toughness and a process for producing the composite sintered body, and provides structural ceramic materials to be used for automobile parts, wear-resistant tools, etc.

2. Description of Prior Art

Silicon nitride is a material well-balanced in strength, fracture toughness, and resistances to corrosion, abrasion, thermal impact, oxidation, etc., and has attracted attention recently as an engineering ceramic for structural materials to be used at room temperature and further at elevated temperature. However, in order to put silicon nitride ceramics to use in the field where high reliability and safety are required of the materials of construction such as automobile parts, it is indispensable to further improve the fracture toughness of the ceramics to overcome the brittleness thereof and also to contrive an increase in the strength thereof. There is disclosed, for example, in Japanese Patent Publication No. 265173/1987 a technique for improving the fracture toughness of a ceramic material by combining silicon nitride matrix with silicon carbide whisker to disperse the whisker in the matrix. It is believed that this method can achieve the improvement in the fracture toughness of a ceramic material because the crack which progresses and expands during the fracture is deflected by the whisker, or extraction or crosslinking of the whisker takes place. Although the fracture toughness of the ceramic material is improved by the combination thereof with the whisker, it is substantially difficult to completely remove the agglomerate of the whiskers by mechanical means since the size thereof is of the order of 1 to 10 $\mu$m and thus the agglomerate as the coarse grain functions as a breaking point, thereby decreasing the strength of the ceramic material.

According to the conventional methods, therefore, it has been difficult to simultaneously improve the strength and the toughness of silicon nitride ceramics, since the fracture toughness thereof has been improved by the addition of the whisker or by allowing large columnar crystals to exist by grain growth of silicon nitride, which has resulted in substantial expansion of the size of defects and a decrease in the strength thereof. Accordingly, it has been a serious problem how to reconcile the improvement in the strength with that in the toughness of a silicon nitride ceramic having a structure in which the silicon nitride matrix is constituted of fine uniform particles free from coarse grains.

SUMMARY OF THE INVENTION

The present invention provides a silicon nitride composite sintered body which comprises crystal grains of silicon nitride and/or sialon having an average minor axis length of 0.05 to 3 $\mu$m and an aspect ratio (the ratio of major axis length to minor axis length) of 10 or less and foreign particles dispersed in the crystal grains and/or the grain boundary phase, said particles having a thermal expansion coefficient of $5 \times 10^{-6}$/°C. or more and an average particle size of 1 to 500 nm.

The above-mentioned foreign particles are preferably selected from among the oxides, nitrides, carbides and silicides of the elements, excluding Si and C, of the groups. IIa, IIIa, IVa, Va, VIa, IIb, IIIb and IVb of the Periodic Table and preferably dispersed in an amount of 0.01 to 20% by volume.

The present invention also provides a process for producing the aforestated silicon nitride composite sintered body which comprises wet mixing silicon nitride powder, at least two sintering aids selected from among $Y_2O_3$, $Al_2O_3$, AlN and MgO and at least one compound selected from among the oxides, nitrides, carbides and silicides of the elements, excluding Si and C, of the groups IIa, IIIa, IVa, Va, VIa, IIb, IIIb and IVb of the Periodic Table to form a molding; heat treating the molding in a nonoxidative atmosphere at a temperature below the sintering temperature to form a solid solution of silicon nitride with at least one member selected from among the oxides, nitrides, carbides and silicides, followed by sintering; and heat treating the resultant sintered body at a temperature below the sintering temperature to precipitate at least one compound selected from among the oxides, nitrides, carbides and silicides in the crystal grains and/or the grain boundary phase of the silicon nitride and/or sialon. The heat treatment for the purpose of dissolving the oxide, nitride, carbide or silicide in the state of solid solution into silicon nitride is preferably carried out at a temperature of 1300° to 1700° C. for 0.5 to 200 hours. The subsequent sintering and heat treatment for the purpose of precipitating the oxide, nitride, carbide or silicide in the crystal grains and/or the grain boundary phase of the silicon nitride and/or sialon are preferably carried out at a temperature of 1500° to 1850° C. and 800° to 1700° C., respectively, for 0.5 to 300 hours.

The silicon nitride composite sintered body of the present invention can be produced by another process which comprises coating the surfaces of silicon nitride crystal grains with an organometallic compound having at least one element, other than C and Si, of the groups IIa, IIIa, IVa, Va, VIa, IIb, IIIb and IVb of the Periodic Table in an amount of 0.01 to 20% by volume in terms of oxide, carbide or nitride; heat treating the coated crystal grains in an oxidative or nonoxidative atmosphere to convert the organometallic compound into the oxide, carbide or nitride in the form of ultrafine powders; then adding thereto at least two sintering aids selected from among $Y_2O_3$, $Al_2O_3$, AlN and MgO; shaping the mixture; and firing the shaped mixture in nitrogen at a temperature of 1400° to 1850° C. to incorporate and disperse said ultrafine powders in the crystal grains and/or the grain boundary phase of the silicon nitride and/or sialon during the grain growth of the silicon nitride.

The sintered body of the present invention obtained by any of the above-mentioned processes is characterized in that the crystal grains of silicon nitride and/or sialon (hereinafter, referred to as "silicon nitride-based crystal grains") as the matrix grains have an average particle size of 3 $\mu$m or smaller, preferably 0.05 to 0.5 $\mu$m in terms of minor axis length and have a homogeneous microstructure composed of granular crystals having an aspect ratio of 10 or less, preferably 6 or less and/or isometric crystals of 1 $\mu$m or smaller; and foreign particles of oxides, nitride, carbide and/or silicide having a thermal expansion coefficient different from that of the silicon nitride-based crystal grains and an average particle size of 1 to 500 nm are dispersed in said crystal grains. Specifically in the sintered body of the present invention, the structure minimized in the size of defects suppresses the strength decreasing factors and generates residual stress in the crystal grains due to the combination of the particles of the order of nanometer, thus improving the strength and the toughness of the sintered body.

DETAILED DESCRIPTION OF THE PREFERRED EMBODIMENTS

In the silicon nitride composite sintered body obtained by the present invention, residual compressive stress due to inequality of thermal expansion coefficient is caused in the silicon nitride-based crystal grains and-/or the grain boundary phase in the step of cooling from the sintering temperature to room temperature because of the foreign particles having a higher thermal expansion coefficient dispersed in the silicon nitride-based crystal grains and/or the grain boundary phase thereof. In the step of breaking, the field of the aforesaid stress is applied to the front of a crack, which increases the resistance to further occurrence of cracks and the progress of the crack, thus enhancing the toughness. It is desirable that the difference in the thermal expansion coefficient between the silicon nitride-based crystal grains and/or the grain boundary phase thereof and the foreign particles be as much as possible. Taking into consideration the thermal expansion coefficient of the silicon nitride-based crystal grains and/or the grain boundary phase being usually $3 \times 10^{-6}/°C$. approximately, the thermal expansion coefficient of the foreign particles is desirably $5 \times 10^{-6}/°C$. or higher but $20 \times 10^{-6}/°C$. or lower. A value of the coefficient higher than $20 \times 10^{-6}/°C$. is unfavorable, since it brings about cracks in the silicon nitride-based crystal grains due to the excessive difference in the thermal expansion coefficient between the silicon nitride-based crystal grains and/or the grain boundary phase thereof and the foreign particles. The foreign particles having a particle size of the order of nanometer are dispersed in said crystal grains and/or the grain boundary phase and, therefore, suppress the increase in the size of defects, whereby the improvement in fracture toughness is reflected on the improvement in strength. In addition, strain is caused by the stress field around the foreign particles dispersed in the grains, dislocation drift in the silicon nitride-based crystal grains is promoted around the foreign particles, the dislocation surface forms a sub-boundary, and the matrix particles are apparently refined, thus improving the strength of the sintered body. An average minor axis length exceeding 3 μm, that is, an average major axis length exceeding 30 μm forms defects and lowers the strength unfavorably, whereas the former smaller than 0.05 μm results in the disadvantages that the matrix structure is excessively refined, plastic deformation is caused even by a weak stress and, conversely, the strength of the sintered body is decreased. The particle size of the dispersed foreign particles is preferably 500 nm or smaller, since an excessively large particle size thereof lowers the effect on the strengthening of the silicon nitride-based crystal grains and the grain boundary phase due to the residual compressive stress and, at the same time, is preferably 1 nm at the smallest, since a particle size of less than 1 nm permits solid solution in the state of atoms into the lattice. The amount of the dispersed foreign particles is desirably 0.01 to 20%, particularly desirably 0.5 to 5%, because an excessively small amount thereof results in failure to exert the composite effect, while an excessively large amount thereof leads to the agglomeration of the foreign particles themselves.

According to the composite sintered body of the present invention as described hereinbefore, the strength and fracture toughness of the sintered body can be enhanced simultaneously by the composite effect of the order of nanometer in the grains and grain boundaries.

The dispersion of the silicon nitride-based crystal grains in the sintered body and the dispersion of the foreign particles in the aforementioned crystal grains according to the sintered body of the present invention are obtained in the course of the solid solution of the foreign particle in the silicon nitride-based crystal grains, sintering and precipitation. Since the temperature region of solid solution initiation is 1300° to 1700° C., the incorporation of the foreign particles in the state of solid solution into the above crystal grains can be promoted by heat treatment at the aforesaid temperature for 0.5 to 200 hours.

Moreover, the succeeding sintering in the temperature region of 1500° to 1850° C. and precipitation in the grains in the temperature region of 800° to 1700° C. give rise to a composite sintered body having the foreign particles of the order of nanometer dispersed in the crystal grains without the discharge of the foreign particles diffused in the form of solid solution outside the crystal grains. A sintering temperature higher than 1850° C. causes agglomeration of the foreign particles in the crystal grains or discharge most of the foreign particles outside the crystalgrains unfavorably, whereas that lower than 1500° C. results in failure to obtain a densified sintered body undesirably. A precipitation temperature lower than 800° C. causes the formation of heterogeneously precipitated particles unfavorably, whereas that higher than 1700° C. does not cause precipitation because of the solid solution is stabilized.

Almost all the foreign particles are incorporated in the silicon nitride-based crystal grains in the course of solid solution formation, but nonincorporated particles remaining outside the grains precipitate and disperse in the grain boundary phase as the particles of the order of nanometer.

In the another process for producing the sintered body according to the present invention, the incorporation of the foreign particles in the silicon nitride-based crystal grains takes place in the course of the grain growth of silicon nitride during sintering. Accordingly, if the ultrafine particles of the order of nanometer are distributed on the surfaces of the silicon nitride-based crystal grains, it is possible for the silicon nitride to grow while incorporating the ultrafine particles. The particles of oxide, carbide and/or nitride that are produced by the surface coating of the organometallic compound followed by thermal decomposition thereof are ultrafine particles having the size of the order of 1 to 500 nm. When, therefore, the particles of oxide, carbide or nitride having the size of the order of micron are mixed with the silicon nitride grains having the size of the order of submicron, the particles are usually left in the grain boundaries of the silicon nitride grains even after sintering. As opposed to the above, the present invention enables almost all the foreign particles to be composited in the silicon nitride grains during the sintering at 1400° to 1850° C. A sintering temperature lower than 1400° C. results in failure to densify the sintered body unfavorably, whereas that higher than 1850° C. leads to the decomposition of silicon nitride undesirably. A size of the ultrafine particles formed after the thermal decomposition of the organometallic compound larger than 500 nm results in failure to incorporate the ultrafine particles in the silicon nitride-based crystal grains, whereas that smaller than 1 nm results in failure to exert the composite effect after the incorporation thereof. Accordingly, the size of the ultrafine particles is preferably in the range of 1 to 500 nm. The foreign particles that are not incorporated in the crystal grains are dispersed and deposited in the grain boundary phase as particles of the order of nanometer in size.

According to the present invention as described hereinbefore, the silicon nitride composite sintered body simultaneously improved in strength and fracture koughness is obtained by virtue of the composite effect in the crystal grains and/or the grain boundary phase having the foreign particles of the order of nanometer in size.

EXAMPLE 1

100 g of silicon nitride powder was compounded with each of various foreign particles in an amount to be dispersed as specified in Table 1, and further with a sintering aid ($Y_2O_3$—$Al_2O_3$) each in 5% by weight, followed by wet mixing. The obtained composite powder was subjected to cold isostatic pressing under a pressure of 1.5 t/cm² into a molding, followed by sintering at 1650° C. and an ordinary pressure in nitrogen for 10 hours. Table 1 gives the species of dispersed particle and mechanical characteristics of the resultant sintered bodies.

TABLE 1

| Sample No. | Dispersed foreign particles | Thermal expansion coeff. ($\times 10^{-6}$/°C.) | Minor axis length of $Si_3N_4$ (μm) (aspect ratio) | Size of foreign particles (nm) | Amt. of dispersion (vol %) | 4-point flexural strength (kg/mm²) | Fracture toughness (MPam$^{1/2}$) |
|---|---|---|---|---|---|---|---|
| 1 | $TiO_2$ | 8.9 | 0.23(3) | 70 | 0.02 | 147 | 7.5 |
| 2 | $TiO_2$ | 8.9 | 0.22(3) | 80 | 0.01 | 145 | 7.9 |
| 3 | TiN | 9.2 | 0.06(5) | 25 | 1.2 | 163 | 10.8 |
| 4 | TiN | 9.2 | 0.05(5) | 20 | 1.0 | 169 | 10.6 |
| 5 | $ZrO_2$ | 11.4 | 0.32(4) | 260 | 0.8 | 180 | 10.7 |
| 6 | $ZrO_2$ | 11.4 | 0.31(4) | 280 | 0.7 | 186 | 10.9 |
| 7 | ZrN | 7.2 | 2.64(9) | 300 | 4.5 | 115 | 7.6 |
| 8 | ZrN | 7.2 | 2.64(9) | 310 | 5.0 | 116 | 7.9 |
| 9 | HfN | 6.9 | 1.38(3) | 95 | 13 | 141 | 8.0 |
| 10 | HfC | 6.6 | 1.51(4) | 90 | 11 | 138 | 7.2 |
| 11 | $Mo_2C$ | 7.8 | 0.67(5) | 75 | 5.5 | 163 | 8.6 |
| 12 | $TaSi_2$ | 8.9 | 0.43(10) | 130 | 0.2 | 144 | 9.3 |
| 13 | $TaSi_2$ | 8.9 | 0.39(10) | 150 | 0.1 | 158 | 10.5 |
| 14 | TaC | 6.3 | 0.45(6) | 60 | 5.0 | 155 | 8.5 |
| 15 | NbN | 10.1 | 0.56(8) | 100 | 1.3 | 174 | 12.4 |
| 16 | $NbSi_2$ | 10.1 | 0.52(7) | 140 | 1.0 | 181 | 11.9 |
| 17 | $Cr_2N$ | 9.4 | 1.56(3) | 340 | 20 | 151 | 9.8 |
| 18 | $Cr_2N$ | 9.4 | 1.59(3) | 320 | 18 | 147 | 9.6 |
| 19 | BN | 6.4 | 0.72(8) | 125 | 3.9 | 137 | 8.0 |
| 20 | BN | 6.4 | 0.68(8) | 120 | 4.5 | 135 | 8.1 |
| 21 | none | — | 0.45(5) | — | — | 130 | 5.5 |

EXAMPLE 2

100 g of silicon nitride powder was mixed with 10% by volume of various foreign particles as specified in Table 2, and further with a sintering aid ($Y_2O_3$—$Al_2O_3$) each in 5% by weight, followed by wet mixing. The obtained composite powder was subjected to cold isostatic pressing under a pressure of 1.5 t/cm² into a molding, which was then heat treated and sintered under the sintering conditions as specified in Table 2. The use of AlN, or MgO as a sintering aid can give the same results.

TABLE 2

| Sample No. | Dispersed foreign particles | Thermal expansion coeff. ($\times 10^{-6}$/°C.) | Solid solution heat treatment temp. (°C.) time (h) | Sintering temp. (°C.)/ sintering time (h)/heat treatment temp. (°C.)/heat treatment time (h) |
|---|---|---|---|---|
| 1 | $TiO_2$ | 8.9 | 1300/1.5 | 1450/2/500/5 |
| 2 | TiN | 9.2 | 1400/50 | 1450/1/1000/20 |
| 3 | $ZrO_2$ | 11.4 | 1400/100 | 1650/15/800/12 |
| 4 | ZrN | 7.2 | 1450/20 | 1700/3/350/1 |
| 5 | HfC | 6.6 | 1450/75 | 1800/8/1200/250 |
| 6 | TaC | 6.3 | 1550/200 | 1650/50/100/100 |
| 7 | $TaSi_2$ | 8.9 | 1650/18 | 1850/2/120/55 |
| 8 | $NbSi_2$ | 10.1 | 1560/30 | 1700/5/600/65 |
| 9 | $Cr_2N$ | 9.4 | 1630/1 | 1650/10/100/3 |
| 10 | BN | 6.4 | 1420/2.5 | 1520/0.5/1100/9 |
| 11 | none | — | 1450/20 | 1700/2/100/270 |

Table 3 gives the size of the dispersed particles and the mechanical characteristics of the resultant silicon nitride composite sintered body of each sample.

TABLE 3

| Sample No. | Size of dispersed particles (nm) | Fracture toughness (MPam$^{1/2}$) | 4-point flexural strength (kg/mm²) |
|---|---|---|---|
| 1 | 20 | 7.8 | 144 |
| 2 | 120 | 10.7 | 166 |
| 3 | 80 | 10.8 | 188 |
| 4 | 200 | 7.8 | 115 |
| 5 | 130 | 7.3 | 136 |

TABLE 3-continued

| Sample No. | Size of dispersed particles (nm) | Fracture toughness (MPam$^{1/2}$) | 4-point flexural strength (kg/mm$^2$) |
|---|---|---|---|
| 6 | 55 | 8.6 | 156 |
| 7 | 65 | 10.4 | 159 |
| 8 | 120 | 11.8 | 183 |
| 9 | 250 | 9.7 | 151 |
| 10 | 85 | 8.2 | 141 |
| 11 | — | 5.4 | 125 |

EXAMPLE 3

100 g of silicon nitride powder was mixed with a solution of each of the organometallic compounds having a metallic element constituting the foreign particles as given in Table 4 in an amount to be dispersed in an organic solvent. The resultant mixture was dried and then heat treated in various atmospheres at 800° C. for 5 hours. By observing the surface-treated powder under a transmission electron microscope, it was confirmed that the coating of the metallic oxide or the like was homogeneously formed on the surfaces of the silicon nitride-based crystal grains.

Thereafter, the coated silicon nitride-based powder was incorporated with a sintering aid ($Y_2O_3$—$Al_2O_3$) each in 5% by weight, followed by wet mixing and drying. The resultant composite powder was subjected to cold isostatic pressing under a pressure of 1.5 t/cm$^2$ into a molding, followed by sintering at 1750° C. and an ordinary pressure in nitrogen for 10 hours. Table 5 gives the size of dispersed particles, amount of dispersion and mechanical characteristics of the resultant sintered body for each sample.

TABLE 4

| Sample No. | Dispersed foreign particles | Thermal expansion coeff. ($\times 10^{-6}$/°C.) | Organometallic compd. |
|---|---|---|---|
| 1 | TiO$_2$ | 8.9 | CH$_3$—CH(CH$_3$)—O—Ti—[O—C$_{18}$H$_{36}$O]$_3$ |
| 2 | TiN | 9.2 | CH$_3$—CH(CH$_3$)—O—Ti—[O—C$_4$H$_{10}$N$_2$]$_3$ |
| 3 | ZrO$_2$ | 11.4 | CH$_3$—CH(CH$_3$)—O—Zr—[O—C$_{10}$H$_{36}$O]$_3$ |
| 4 | ZrN | 7.2 | CH$_3$—CH(CH$_3$)—O—Zr—[O—C$_4$H$_{10}$N$_2$]$_3$ |
| 5 | HfN | 6.9 | Hf (O-t-C$_4$H$_9$)$_4$ |
| 6 | Ta$_2$O$_5$ | 2.4 | Ta (O-nC$_4$H$_9$)$_5$ |
| 7 | TaN | 3.6 | CH$_3$—CH(CH$_3$)—O—Ta(—O—C(=O)—C(=O)—C$_{17}$H$_{35}$)(—[O—C—C—(H$_3$)]with =O) |
| 8 | NbC | 7.2 | CH$_3$—CH(CH$_3$)—O—Nb—[O—C$_6$H$_4$—C(CH$_3$)(CH$_3$)—C$_6$H$_5$] |
| 9 | Cr$_2$N | 9.4 | (C$_6$H$_6$)$_2$Cr |
| 10 | B$_4$C | 4.5 | C$_2$H$_5$—CH(C$_3$H$_7$)—O—B[O—C(=O)—C$_8$H$_{17}$]$_3$ |
| 11 | None | — | — |

TABLE 5

| Sample No. | Heat treatment atmosphere | Size of foreign particles (nm) | Amount of dispersion (vol %) | 4-point flexural strength (kg/mm²) | Coating amount (Vol %) | Sintering temperature °C. | Fracture toughness (MPam$^{1/2}$) |
| --- | --- | --- | --- | --- | --- | --- | --- |
| 1 | Air | 65 | 0.05 | 142 | 0.05 | 1620 | 7.6 |
| 2 | $N_3$ | 20 | 1.5 | 166 | 0.5 | 1820 | 10.5 |
| 3 | Air | 270 | 11 | 183 | 11 | 1800 | 10.5 |
| 4 | $NH_3$ | 330 | 5.6 | 113 | 5.6 | 1750 | 7.4 |
| 5 | $NH_3$ | 100 | 16 | 135 | 16 | 1650 | 7.2 |
| 6 | Ar | 45 | 5.8 | 100 | 5.8 | 1450 | 4.4 |
| 7 | $N_3$ | 140 | 9.0 | 115 | 9.0 | 1700 | 5.1 |
| 8 | $CH_4$ | 130 | 1.5 | 175 | 1.5 | 1750 | 11.4 |
| 9 | $NH_3$ | 335 | 20 | 186 | 20 | 1810 | 12.2 |
| 10 | CO | 120 | 10 | 117 | 10 | 1770 | 4.5 |
| 11 | — | — | — | 125 | — | 1750 | 5.2 |

Note:
Samples Nos. 6, 7, 10 and 11: Comparative Samples

The present invention can provide a silicon nitride composite sintered body excellent in strength and fracture toughness, and a ceramic utilizable for various structural members typified by automobile parts of which high strength and high toughness are required.

What is claimed is:

1. A composite sintered body consisting essentially of:
    (1) grains of silicon nitride and/or sialon,
    (2) at least two sintering aids selected from the group consisting of $Y_2O_3$, $Al_2O_3$, AlN, and MgO, and
    (3) foreign particles,
    said grains consisting essentially of granular crystals having an average particle size of 0.05 to 3 μm in terms of minor axis, and an aspect ratio of 10 or less, and isometric crystals having an average particle size of 1 μm or less;
    said foreign particles being at least one compound selected from the group consisting of oxides, nitrides, carbides, and silicides of elements of Groups IIa, IIIa, IVa, Va, VIa, IIb, IIIb, and IVb, of the Periodic Table, excluding Si and C, dispersed in the crystal grains or in the crystal grains and in the grain boundary phase, in an amount of 0.01 to 20% by volume, said particles having a thermal expansion coefficient of $5 \times 10^{-6}$° C. to $20 \times 10^{-6}$° C. and an average particle size of 1 to 500 nm.

* * * * *